(12) United States Patent
Sasaki et al.

(10) Patent No.: US 8,722,129 B2
(45) Date of Patent: May 13, 2014

(54) PROCESS FOR PRODUCING MODIFIED GUM ARABIC

(75) Inventors: Yasushi Sasaki, Toyonaka (JP); Takeshi Ogasawara, Toyonaka (JP); Tsuyoshi Katayama, Toyonaka (JP); Makoto Sakata, Toyonaka (JP)

(73) Assignee: SAN-EI GEN F.F.I., Inc., Toyonaka-shi (JP)

( * ) Notice: Subject to any disclaimer, the term of this patent is extended or adjusted under 35 U.S.C. 154(b) by 1455 days.

(21) Appl. No.: 10/571,266

(22) PCT Filed: Sep. 2, 2004

(86) PCT No.: PCT/JP2004/013092
§ 371 (c)(1),
(2), (4) Date: Mar. 9, 2006

(87) PCT Pub. No.: WO2005/026213
PCT Pub. Date: Mar. 24, 2005

(65) Prior Publication Data
US 2007/0031566 A1 Feb. 8, 2007

(30) Foreign Application Priority Data
Sep. 10, 2003 (JP) .................................. 2003-318958

(51) Int. Cl.
*A23L 1/05* (2006.01)
*A23L 1/053* (2006.01)

(52) U.S. Cl.
USPC .......................................... 426/573; 426/520

(58) Field of Classification Search
USPC .................................. 426/573, 520
See application file for complete search history.

(56) References Cited

U.S. PATENT DOCUMENTS 5,476,678 A * 12/1995 Walter et al. .................. 426/660

FOREIGN PATENT DOCUMENTS

| EP | 1505078 | 2/2005 |
|---|---|---|
| EP | 1612225 | 1/2006 |
| JP | 58-183701 | 10/1983 |
| JP | 02-049001 | 2/1990 |
| JP | 8-41104 | 2/1996 |
| JP | 11-113486 | 4/1999 |
| JP | 2000-166489 | 6/2000 |
| JP | 2000166489 A * | 6/2000 |
| JP | 2003-321502 | 11/2003 |
| WO | WO 02/072862 | 9/2002 |
| WO | WO 2004/089991 | 10/2004 |

OTHER PUBLICATIONS

Whistler et al , Industrial Gums, 1973, p. 205, total pp. 4.*
"Particle Size Conversion" Standard sieve sizes obtained from: http://www.sigmaaldrich.com/chemistry/stockroom-reagents/learning-center/technical-library/particle-size-conversion.html, Aug. 1, 2010, pp. 2.*
Whistler et al, Industrial Gums, Academic press, 1973 Edition, pp. 197-263.*
Phillips et al; "Hydration characteristics of the gum exudates from *Acacia senegal*;" Food Hydrocolloids vol. 10 No. 1 (1996) 11-19.
European Search Report dated Mar. 9, 2007.
Nakamura et al; "Effect of Molecular Weight of Gum Arabic on Stability of Emulsion;" Yakuzaigaku 47 (1) (1982) pp. 25-29. (see specification pp. 1-2).
Williams et al; "Gum Arabic;" *Handbook of Hydrocolloids* (2000), pp. 155-168. (see specificaiton pp. 1-2).
Osman et al; "The molecular characterisation of the polysaccharide gum from *Acacia senegal*;" Carbohydrate Research 246 (1993) pp. 303-318. (see specification pp. 1-2).

* cited by examiner

*Primary Examiner* — Jyoti Chawla
(74) *Attorney, Agent, or Firm* — Kratz, Quintos & Hanson, LLP

(57) ABSTRACT

The invention provides a method for efficiently improving emulsifying ability of gum arabic, in other words, a method for producing gum arabic with excellent emulsifying ability. Further, the present invention provides a method by which a gum arabic modified so as to have a high emulsifying ability can be obtained without involving the problem of forming syrupy masses or sticking to the vessel or the trouble of excessive dehydration or charring. The above-described methods can be carried out by heating gum arabic (unmodified) under dry conditions. Preferably, the method is carried out by heating gum arabic in such a manner that the loss-on-drying is not more than 3%.

10 Claims, 6 Drawing Sheets

Relationship between modification conditions (loss on drying) and discoloration

Relationship between loss on drying and particle diameter under heat at 125°C

Relationship between particle diameter and emulsifying property under heat at 125°C

PROCESS FOR PRODUCING MODIFIED GUM ARABIC

TECHNICAL FIELD

The invention relates to a method for producing modified gum arabic. More specifically, the invention relates to a method for producing gum arabic with excellent emulsifying ability while preventing discoloration and caking. The invention further relates to gum arabic (here in after referred to as "modified gum arabic") obtained by a production method that has an increased emulsifying ability and is free from disadvantages, such as discoloration, etc., and also relates to a use thereof.

BACKGROUND OF THE INVENTION

Gum arabic is a natural polymer having a good emulsifying ability and exhibiting low viscosities even in high concentration solutions, and because of these characteristics, is widely used as an emulsifier in the food and pharmaceutical fields. However, it is also known that natural gum arabic, when used as is, does not exhibit satisfactory emulsifying properties.

Gum arabic is collected in various countries in the Sahara region of Africa and has a wide variation in molecular weight and composition of constituent components due to differences in the soil and climate in each habitat and age of the source tree. For this reason, functions of gum arabic in its original state delivered from the habitat are nonuniformity, and thereby the properties of application products using such gum arabic are not consistent (Williams, P. A. and Phillips, G. O., (2000) in Handbook of Hydrocolloids, pp. 155-168, Editors: Williams, P. A. and Phillips, G. O., Woodhead, London and New York). In the present specification, such gum arabic is referred to as simply "gum arabic" or "natural gum arabic" or "gum arabic (unmodified)", as distinguished from "modified gum arabic" of the present invention.

In order to solve the problems, several methods have been proposed and studied to reduce as much as possible the variation of emulsifiability between product lots attributable to the variation of the properties of the gum arabic (unmodified) and to improve emulsifiability. For instance, one method comprises removing metal ions from gum arabic to obtain arabic acid and subjecting it to thermal modification to improve (modify) its emulsifiability (Japanese Unexamined Patent Publication No. 1990-49001), and another method comprises modifying gum arabic having a loss-on-drying of not more than 50% by weight by heating it at 60° C. to 140° C. for not less than 30 minutes to thereby improve (modify) its emulsifiability (Japanese Unexamined Patent Publication No. 2000-166489).

However, these methods have drawbacks that, in the course of heating, gum arabic browns, melts and adheres to form syrupy masses, or undergoes charring. Browned gum arabic causes serious problems when used as an emulsifier, especially in a product whose appearance is considered important, such as foods, cosmetics, and the like. Further, when gum arabic melts, it gets stuck to the vessel, which makes it difficult to remove. Furthermore, once a syrupy mass is formed, gum arabic is difficult to pulverize to a powder for use as an emulsifier, and is not readily soluble in water. As gum arabic chars, such problems as odor emanation, formation of insoluble matter such as charcoal, and blackening of gum arabic solutions are likely to occur.

In addition to the aforementioned documents relating to modification of gum arabic, documents relating to gum arabic include WO02/072862, Japanese Unexamined Patent Publication No. 1983-183701, "Mikio Nakamura, *Pharmaceutics*, Vol. 42, No. 1 (1982) pp. 25-29" and "*Carbohydrate Research*, 246 (1993) pp. 303-318".

SUMMARY OF THE INVENTION

The invention aims to alleviate or solve the above-mentioned problems, and to provide a method for producing modified gum arabic in such a manner as to improve its emulsifying ability. More specifically, an object of the present invention is to provide a method for efficiently improving the emulsifying ability of gum arabic and a method for producing modified gum arabic in such a manner as to have a high emulsifying ability without involving problems of forming syrupy masses or sticking to the vessel or the trouble of charring.

Another object of the invention is to provide the thus-obtained gum arabic having a good emulsifying ability, and a use of said gum arabic as an emulsifier.

The inventors conducted intensive research to overcome the above-described problems, and found that the above objects can be accomplished by subjecting gum arabic to a heat treatment under dry conditions.

The present invention has been accomplished based on such findings. The present invention embraces the following aspects.

Item 1. A method for producing modified gum arabic, the method comprising the step of heating gum arabic under dry conditions.

Item 2. A method for producing modified gum arabic, the method comprising the step of heating gum arabic in such a manner that the loss-on-drying is not more than 3%.

Item 3. The method for producing modified gum arabic according to Item 1 or 2, wherein gum arabic is heated at a temperature of 90° C. to 180° C.

Item 4. The method for producing modified gum arabic according to any one of Items 1 to 3, the method comprising the steps of drying gum arabic until the loss-on-drying is not more than 3%, and subsequently heating the dried gum arabic.

Item 5. The method for producing modified gum arabic according to any one of Items 1 to 4, wherein gum arabic is heated at reduced pressure.

Item 6. The method for producing modified gum arabic according to any one of Items 1 to 5, wherein gum arabic before treatment has an average particle diameter of not more than 1.5 mm.

Item 7. The method for producing modified gum arabic according to any one of Items 1 to 6, wherein gum arabic before treatment is spray-dried.

Item 8. The method for producing modified gum arabic according to any one of Items 1 to 7, wherein discoloration is suppressed and emulsifying ability is increased in the modified gum arabic.

Item 9. Modified gum arabic, which is obtained by a production method of any one of Items 1 to 8.

Item 10. An emulsifier, comprising as an active ingredient a modified gum arabic obtained by a production method of any one of Items 1 to 8.

Item 11. A method for preparing an emulsion, wherein a modified gum arabic obtained by a production method of any one of Items 1 to 8 is used as an emulsifier.

Item 12. The method for preparing an emulsion according to Item 11, wherein the emulsion is an O/W or W/O/W emulsion which contains, as a dispersoid, at least one hydrophobic substance selected from the group consisting of essential oils, oil-based flavorings, oil-based colorants, fat-soluble vitamins, polyunsaturated fatty acids, animal oils, vegetable oils, sucrose acetate isobutyrate, and medium-chain triglycerides.

Item 13. The emulsion, which is prepared by a preparation method of Item 11 or 12.

Item 14. The emulsion according to Item 13, which is an O/W or W/O/W emulsion containing, as a dispersoid, at least one hydrophobic substance selected from the group consisting of essential oils, oil-based flavorings, oil-based colorants, fat-soluble vitamins, polyunsaturated fatty acids, animal oils, vegetable oils, sucrose acetate isobutyrate, and medium-chain triglycerides.

Item 15. Use of a modified gum arabic obtained by a production method of any one of Items 1 to 8 for preparing an emulsifier.

Item 16. Use of a modified gum arabic obtained by a production method of any one of Items 1 to 8 for preparing an emulsion.

Sample 1): Gum arabic beads, unpulverized (particle diameter of 2 mm to 100 mm, average particle diameter of 30 mm)

Sample 2): Coarse pulverizates of gum arabic beads (particle diameter of 0.5 mm to 15 mm, average particle diameter of 6 mm)

Sample 3): Pulverizates of gum arabic beads (particle diameter of 0.1 mm to 2 mm, average particle diameter of 1.5 mm)

Figure 5:
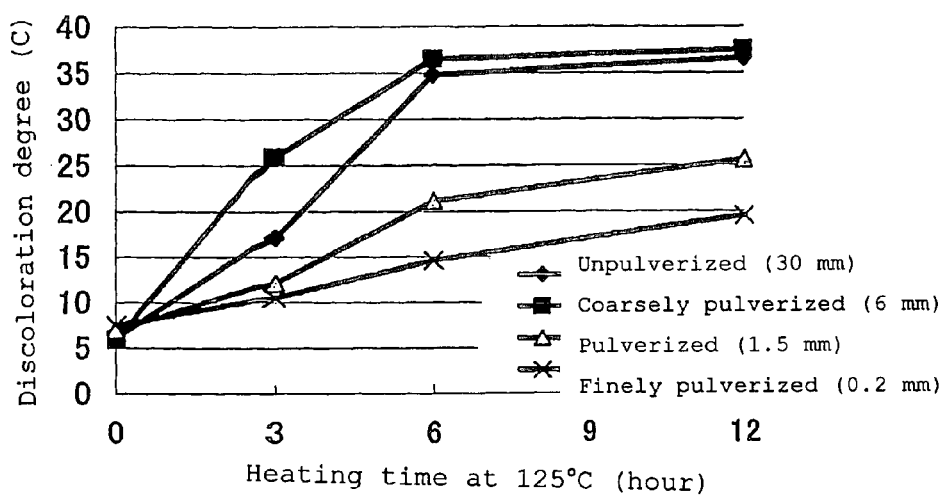

Sample 4): Fine pulverizates of gum arabic beads, (particle diameter of 0.038 mm to 0.5 mm, average particle diameter of 0.083 mm (83 μm) FIG. 5 shows the relationship between discoloration degree and particle diameter (mm) when each of the above samples 1) to 4) obtained according to Experimental Example 2 was heated at 125° C.

Figure 6:
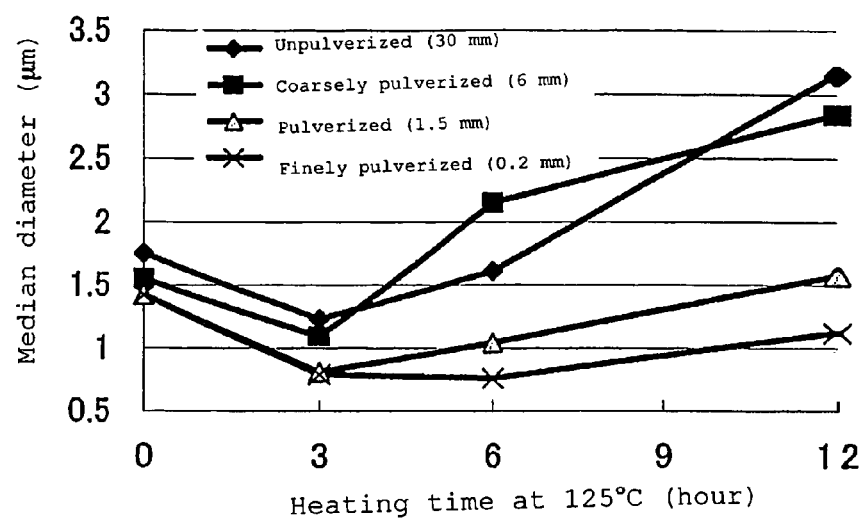

FIG. 6 shows the relationship between increased degree of emulsifying ability (average particle diameter of emulsion (median diameter) (μm)) and particle diameter of gum arabic when each of the above samples 1) to 4) obtained according to Experimental Example 2 was heated at 125° C.

BEST MODE FOR CARRYING OUT THE INVENTION (1) Method for Producing Modified Gum Arabic The present invention relates to a method for producing gum arabic with increased emulsifying ability while avoiding problems such as discoloration, and the like. In other words, the invention relates to a method for modifying gum arabic so as to improve its emulsifying ability while avoiding problems such as discoloration, and the like. Therefore, the invention can be said to be "a method for modifying gum arabic", "a method for increasing the emulsifying ability of gum arabic", or "a method for suppressing discoloration in modifying (increasing emulsifying ability) gum arabic".

The method of the invention can be practiced by heating gum arabic under dry conditions.

In the method of the invention, gum arabic (unmodified) to be modified (starting material gum arabic) is a natural exudate obtained from the trunks and branches of *Acacia senegal* or *Acacia seyal* of the genus *Acacia*, family Leguminasae or any other plant belonging to the same genus. It is also possible to use, as gum arabic (unmodified), one obtained by subjecting the natural exudate to a treatment such as purification, desalting, pulverization, spray drying, etc.

Unmodified gum arabic (*Acacia senegal*) is produced in countries of North and West Africa from Ethiopia to Senegal (e.g., Ethiopia, Sudan, Senegal, Nigeria, Niger, and Ghana), countries of East Africa such as Kenya and Uganda, the Sahara region of Africa, and the basins of the tributaries of the Nile, but the place of production of unmodified gum arabic is not limited thereto. Any unmodified gum arabic (*Acacia senegal*) can be used in the present invention regardless of its origin.

Furthermore, gum arabic (unmodified) is not limited in its moisture content. The moisture content of gum arabic (unmodified) as is usually available from commercial sources is reduced when dried by heating at 105° C. for 6 hours (loss-on-drying) of not more than 30 % by weight, preferably not more than 20% by weight, more preferably not more than 15% by weight. In the present invention, any gum arabic (unmodified) having such a moisture content (loss-on-drying) can be suitably selected and used.

Gum arabic (unmodified) is available in such forms as blocks, beads, crude pulverizates, granules, pellets, and powders, and unmodified gum arabic of any form can be used without limitation in the present invention. In view of the object of producing modified gum arabic (gum arabic with an increased emulsifying ability) in a short period of time while suppressing discoloration, gum arabic having an average particle diameter of not more than 1.5 mm is preferable, and gum arabic having an average particle diameter of not more than 1 mm is more preferable. The average particle diameter is even more preferably not more than 0.5 mm, and particularly preferably not more than 0.2 mm. For example, pulverizates, fine pulverizates, granules, pellets, and powders that have an average particle diameter ranging from 0.01 mm to 0.2 mm, and fine pulverizates having an average particle diameter of several tens μm to several hundred μm (including spray-dried pulverizates) are preferable.

In the invention, "average particle diameter" denotes the geometric diameter measured according to "sieving method (JIS Z 8815 (1994))", (dry method). More specifically, the method comprises the steps of using eight "test sieves (JIS Z 8801 (1994)" having different mesh sizes, placing the sieves one upon another in descending order with the largest mesh size at the top and the smallest mesh size at the bottom, placing a weighed gum arabic sample (20 g) to be measured in the top sieve, agitating under the conditions described later, and then measuring the weight (accumulated weight after sieving) of the sample remaining in each sieve. The obtained values are plotted on a semilogarithmic graph in which the ordinate represents the accumulated weight (%) and the abscissa represents the logarithm of the seize opening of mesh (mm) of each sieve, thereby obtaining a log approximation line and an approximation formula for the seize opening of mesh and accumulated weight. Then, the seize opening of mesh, through which the sample is sieved and the accumulated weight reaches 50% by weight of the total amount (20 g), is calculated by the approximation formula to determine the average particle diameter of the sample.

<Agitating Conditions>

Sieve: Automatic Seive MRK-RETAC (manufactured by Mitamura Riken Kogyo Inc.)
Agitating period: 15 minutes
Amplitude scale: 70

Any method for heating gum arabic (unmodified) can be employed insofar as gum arabic (unmodified) is heated under dry conditions as described above. Please note that the "method for heating gum arabic (unmodified) under dry conditions" includes (1) a method for heating gum arabic (unmodified) until it is dried, i.e., a method for simultaneously heating and drying gum arabic, and (2) a method for heating gum arabic in a dry state. The invention includes both methods (1) and (2).

In this specification, the level that gum arabic is dried can be evaluated on the basis of the loss-on-drying of gum arabic. The term "loss-on-drying" used herein denotes the amount of moisture loss (% by weight) when the target gum arabic is dried by heating at 105° C. for 6 hours, and is usually used as an indication of the moisture content of gum arabic, in other words, the dry degree of gum arabic. The loss-on-drying of the gum arabic is preferably not more than 3%. The fact that gum arabic has a loss-on-drying of not more than 3% denotes that the moisture content of the gum arabic is reduced by not more than 3% by weight when the target gum arabic is dried by heating at 105° C. for 6 hours, taking the weight of gum arabic before drying by heating as 100% by weight. In other words, the moisture content of the target gum arabic (the amount of moisture lost when the gum arabic is dried by heating at 105° C. for 6 hours) is not more than 3% by weight based on 100% by weight of the target gum arabic. The loss-on-drying of gum arabic is preferably not more than 1%, and more preferably not more than 0.3%.

More specifically, the "method for heating gum arabic (unmodified) under dry conditions" of the invention includes the following two methods (1) and (2). Method (1) comprises heating gum arabic (unmodified) in such a manner that the loss-on-drying is not more than 3%, preferably not more than 1%, and more preferably not more than 0.3% as described above. Method (1) can be said to be a method for heating gum arabic (unmodified) and drying it until the loss-on-drying falls within the above-mentioned range. Method (2) comprises drying in advance gum arabic (unmodified) in such a manner that the loss-on-drying becomes not more than 3%, preferably not more than 1%, and more preferably not more than 0.3%, and then heating the gum arabic thus dried.

There is no limitation to a manner for carrying out the above-described methods insofar as the above-described conditions are satisfied. For example, examples of method (1) include a method for heating gum arabic (unmodified) at reduced pressure, a method for heating gum arabic (unmodified) at low humidities or under dry conditions, and other methods. Note that the method of the invention also includes methods for heating gum arabic (unmodified) at normal pressures or under normal humidity conditions so as to have a loss-on-drying of the gum arabic (unmodified) of not more than 3%. However, such methods for heating gum arabic at normal pressures or under normal humidity conditions so as to have a loss-on-drying of not more than 3% may possibly cause problems such as discoloration because the gum arabic (unmodified) with high moisture content is subjected to a prolonged heating treatment. Considering this, the heating process is preferably conducted under the above-described reduced pressure conditions, low humidity conditions, or dry conditions.

Any "reduced pressure conditions" can be used in the method for heating at reduced pressure, insofar as gum arabic (unmodified) can be dried in such a manner that the loss-on-drying of gum arabic (unmodified) is preferably not more than 3%, more preferably not more than 1%, and particularly preferably not more than 0.3% by weight. In general, pressure conditions at about 0.4 atm. (about 40530 Pa) are preferable, at about 0.07 atm. (about 7093 Pa) are more preferable, and at about 0.03 atm. (about 3040 Pa) are still more preferable.

The process of heating at the above-described reduced pressure conditions can be carried out by placing the target gum arabic (unmodified) in an airtight container equipped with a pressure reducing line from an aspirator or a vacuum pump, or the like containers, and then heating the contents of the container while stirring at reduced pressure. Such a heating process can be carried out in a simple manner, and for example, gum arabic may be heated while rotating a rotary evaporator at reduced pressure. Examples of industrially usable apparatuses include reduced-pressure dryers and vacuum dryers. These apparatuses can reduce the pressure inside a container by an aspirator, vacuum pump, etc., and also can uniformly mix the contents of the container with a screw, or the like. The apparatus can be provided with a device capable of heating the contents by introducing steam into a jacket provided on the exterior of a container, which makes it possible to simultaneously perform the steps for producing modified gum arabic of the invention, such as drying (removing moisture), mixing, and heating. After the heating process is complete, the above-described apparatus mixes the contents while cooling by flowing water through the jacket provided on the exterior of a container, thereby rapidly cooling the gum arabic thus modified.

Specific examples of such apparatuses include RIBOCONE (conical ribbon vacuum dryer (RM-VD type): manufactured by OKAWARA MFG. CO.,LTD.), a vacuum Nauta Mixer NXV (manufactured by HOSOKAWAMICRON CORPORATION), planetary conical mixing dryer SV mixer (manufactured by Shinko Pantec Co., Ltd.), etc.

Any "low humidity or dry conditions" can be employed in the method for heating at low humidity or dry conditions, insofar as gum arabic (unmodified) can be dried in such a manner that the loss-on-drying of gum arabic (unmodified) is preferably not more than 3%, more preferably not more than 1%, and particularly preferably not more than 0.3% by weight.

The heating temperature adopted in these methods is not limited, and may be, for example, from 90° C. to 180° C., preferably 100° C. to 150° C., and more preferably 110° C. to 140° C. In the case of a temperature exceeding 180° C., even a short time of heating causes excessive discoloration or charring, while in the case of a temperature of 90° C. or less, although there is no such problem, prolonged heating is required for modifying the gum arabic to improve the emulsifiability, and thus gum arabic cannot be modified efficiently in a short time. A suitable heating time varies depending on the heating temperature, and may be for example, about 5 to about 48 hours at 100° C., about 1 to about 8 hours at 125° C., and about 15 minutes to about 2 hours at 150° C. The heating time adopted can be suitably determined in consideration of the degree of modification of the gum arabic such as the degree of improvement of emulsifiability of the gum arabic and the change (suppression degree) in appearance, e.g., discoloration, etc.

Examples of method of (2) above include a method comprising the steps of drying in advance gum arabic (unmodified) in such a manner that the loss-on-drying is preferably not more than 3%, more preferably not more than 1%, and still more preferably not more than 0.3%, and then heating the gum arabic thus dried. In this method, there is no limitation to the pre-drying method, and for example, gum arabic can be dried by allowing to stand in a thermostat. However, it is preferable to dry gum arabic by heating under reduced pressure conditions so as to obtain modified gum arabic with suppressed discoloration in a shorter time.

The temperature to be employed in the drying process is not limited. The drying process may be performed under cooling, warming, or heating conditions insofar as the process can efficiently dry gum arabic and does not adversely affect the aims and effects of the invention, i.e., obtaining modified gum arabic with suppressed discoloration and an improved emulsifying ability. Such drying processes are not limited, and as a preferable example can be mentioned a process for drying gum arabic (unmodified) at a temperature of not more than 100° C. at reduced pressure (e.g., about 0.07 atm. (about 7093 Pa) or less, and preferably about 0.03 atm. (about 3040 Pa), or less. More preferably, a method for drying gum arabic at 40° C. to 90° C. for about 10 minutes to about 1 hour at reduced pressure (e.g., about 0.07 atm. (about 7093 Pa) or less, and preferably about 0.03 atm. (about 3040 Pa) or less, can be mentioned.

The heating temperature in method (2) is not limited, and may be the same as that in method (1), i.e., 90° C. to 180° C., preferably 100° C. to 150° C., and more preferably 110° C. to 140° C. The humidity conditions for the heating process are not limited, and reduced pressure conditions or low humidity (reduced humidity) conditions in which a dry state is maintained are preferable.

The heating time employed in the method of the invention is not limited because it varies depending on the heating temperature. Heating for about 5 to about 48 hours at 100° C., about 1 to about 8 hours at 125° C., and about 15 minutes to about 2 hours at 150° C. can be mentioned as examples. The heating time to be employed can be suitably determined in consideration of the degree of modification of the gum arabic, such as the improvement in the degree of emulsifiability of the gum arabic and the change (suppression degree) in appearance, e.g., discoloration, etc.

According to a heat treatment under the above-described conditions, the emulsifying ability of the target gum arabic can be efficiently improved in a short time while significantly suppressing discoloration.

In either method (1) or (2) above, at least the heat treatment may be performed under anoxic conditions or reduced oxygen conditions, such as conditions where oxygen is replaced by nitrogen. A heat treatment under such conditions can further suppress discoloration of the obtained gum arabic.

The method of the invention can produce and provide gum arabic that is modified to have an increased emulsifying ability, compared with the gum arabic (unmodified) used as a starting material. Furthermore, the method of the invention can produce and provide modified gum arabic whose emulsifying ability is improved and in which problems such as discoloration, odor, caking, and the like that make handling difficult and inhibit the application of gum arabic to other products as an additive have been significantly suppressed.

The modified gum arabic obtained according to the method of the invention is suitable as an additive, such as an emulsifier, etc., particularly for use in products wherein color or odor may be undesirable, such as foods, perfumes, cosmetics, pharmaceuticals, quasi-drugs, and the like. Accordingly, the method for producing modified gum arabic of the invention may further comprise the step of preparing the modified gum arabic into a required or suitable state (composition or form) in such a manner that the modified gum arabic can be applied as an additive, such as an emulsifier, to various products, such as foods, perfumes, cosmetics, pharmaceutical preparations, quasi-drugs, and the like, in addition to the above-described heating step.

(2) Method for Preparing an Emulsifier and an Emulsion

The modified gum arabic prepared by the above method can be clearly distinguished from untreated gum arabic (unmodified) by its remarkably high emulsifying ability. The emulsifying ability of modified gum arabic is preferably such that, when an emulsion is prepared by using it, the average particle diameter of droplets (dispersed phase) forming the emulsion is not more than 1 µm, and preferably not more than 0.8 µm. The method for preparing a reference emulsion for use in evaluating the emulsifying ability and the method for measuring the average particle diameter can be conducted following the procedure of Experimental Example 1(3) described later.

The modified gum arabic of the invention can be suitably used as an emulsifier in the fields of foods, pharmaceuticals, quasi-drugs, and cosmetics, and particularly for products which may be taken orally. To be more specific, the modified gum arabic of the invention can be suitably used as an emulsifier to emulsify foods such as drinks, powdered drinks, desserts, chewing gums, tablet confections, snack confections, processed fish products, processed animal products, retort foods, etc.; coatings for tablets and other products; oil-based flavorings; oil-based colorants, etc. The above-described modified gum arabic per se can be used as an emulsifier when formed into a solution, a granular, or powder; however, it is also possible to prepare it as an emulsifier by adding other carriers and/or additives according to the usual manner in the above-mentioned fields, if necessary. In this case, the carriers and additives to be used can be suitably selected in the routine manner according to the type and usage of the product to be emulsified. For example, modified gum arabic can be added with dextrin, maltose, lactose, and like saccharide, or glycerol, propylene glycol, and like polyhydric alcohols.

The present invention further provides a method for preparing an emulsion using said modified gum arabic as an emulsifier. This emulsion can be prepared by dispersing and stabilizing a hydrophobic substance, which is a dispersoid, in a hydrophilic solvent using the above-mentioned modified gum arabic as an emulsifier. Examples of emulsion shown in the present invention include an oil-in-water (O/W) emulsion or a W/O/W emulsion.

The hydrophobic substance to be emulsified in the present invention is not limited insofar as it is a substance which can be generally formed into an emulsion or must be processed into an emulsion; however, hydrophobic substances which are used in the field of foods, pharmaceuticals, quasi-drugs or fragrances and cosmetics are preferable, and hydrophobic substances that can be taken orally, i.e., edible hydrophobic substances are more preferable.

Specific examples include essential oils derived from plant sources, for example, citrus plants such as orange, lime, lemon, grapefruit, etc.; oleo resins derived by the oleoresin process from plant sources such as pepper, cinnamon, ginger, etc.; absolutes derived by the absolute process from plant sources such as jasmine, rose, etc.; oil-based flavorings such as oil-based synthetic flavorings and oil-based blending flavorings, etc.; oil-based colorants such as β-carotene, paprika color, lycopene, palm oil, carotene, Donalliella carotene, carrot carotene, etc.; fat-soluble vitamins such as vitamin A, D, E, and K; polybasic unsaturated fatty acids such as docosahexaenoic acid, eicosapentanoic acid, γ-linolenic acid, etc.; animal and vegetable fats and oils such as soybean oil, rapeseed oil, corn oil and fish oil; SAIB (sucrose acetate isobutyrate), food processing oils such as $C_6$-$C_{12}$ medium-chain triglycerides, and optionally mixtures of such edible oil-based materials.

The method for preparing an emulsion using the above-described modified gum arabic is not limited and may comprise a step of mixing a hydrophobic substance and a hydrophilic solvent in the presence of the modified gum arabic according to the standard method for preparing oil-in-water (O/W) emulsions or W/O/W emulsions, by mechanical agitation, for example using a homogenizer or a high-pressure injection system. In particular, the following process can be mentioned as an example.

First, the modified gum arabic is dissolved in a hydrophilic solvent such as water, and, if necessary, contaminants are removed by a suitable solid-liquid separation means such as centrifugation or filtration with a filter press or the like, giving an aqueous gum arabic solution. An objective hydrophobic substance (for example, oil or fat, or a mixture obtained by dissolving a flavoring or a colorant in such oil or fat) is admixed with the obtained aqueous gum arabic solution using a stirrer for preliminary emulsification. During this process, its specific gravity may be adjusted using a specific gravity control agent such as SAIB. The preliminary emulsion mixture thus obtained is then emulsified using emulsifying equipment.

Examples of usable hydrophobic substances include the substances mentioned above. However, when an emulsified flavoring or an emulsified colorant is to be prepared using oil-based flavoring or colorant, it is preferable to use a solution mixture wherein an oil-based flavoring or colorant is dissolved beforehand in oil or fat as the hydrophobic substance. This makes it possible to further stabilize the emulsion and prevent the evaporation of components. The oils or fats in which such an oil-based flavoring or colorant is to be dissolved are not particularly limited but usually medium-chain triglycerides ($C_{6-12}$ fatty acid triglycerides) or vegetable oils such as corn oil, safflower oil and soybean oil can be employed.

The emulsifying equipment for use in the emulsification is not limited and can be suitably selected according to the particle size of the objective emulsion and the viscosity of the material. For example, a high-pressure homogenizer, or emulsifying equipment, such as a Disper Mill, a colloid mill, etc. can be employed.

As mentioned above, the emulsification may be carried out by adding a hydrophobic substance to a hydrophilic solvent with stirring, driving an impeller for preliminary emulsification to prepare an emulsion with a particle diameter of 2 μm to 5 μm, and finally treating it with emulsifying equipment such as a homogenizer to give an emulsion having fine and uniform particles (for example, average particle diameter of not greater than 1 μm, and preferably 0.8 μm).

Many colorants including β-carotene exist in the form of crystal suspensions. Therefore, in order to prepare such colorants into emulsions (emulsified colorants), it is preferable to mix and dissolve crystals of colorant in a suitable oil or fat at an elevated temperature beforehand, and then add the resulting solution into a hydrophilic solvent.

Compared with an emulsion prepared using ordinary gum arabic (unmodified), an emulsion prepared using the modified gum arabic of the invention has a uniform particle size distribution and is very stable, so that emulsified particles are significantly prevented from degradation due to coagulation or unification of the emulsified particles caused by hard dealing (severe conditions) such as heating, long-term storage, changes over time, etc.

EXAMPLES

Hereinafter, the present invention is described in more detail with reference to the following Experimental Examples and Examples, but the invention is not limited thereto.

Experimental Example 1

300 g of spray dried gum arabic (unmodified) (*Acacia senegal*) powder (loss-on-drying: 11.3%, particle diameter: 38 μm to 300 μm, average particle diameter: 64 μm) was processed under the following three different conditions to prepare gum arabic samples. The gum arabic samples thus obtained were measured for loss-on-drying (%), discoloration degree, emulsifying properties [average particle diameter (median diameter) (μm)], weight average molecular weight, content of arabinogalactan protein (AGP content (%)), flavor, and appearance, according to the evaluation methods described below.

I. Processing Condition 1

300 g of gum arabic (unmodified) was placed in a 1 L eggplant-type flask, and heated at 125° C. for 1 to 8 hours while slowly rotating with a rotary evaporator at reduced pressure (about 0.03 atm. (about 3040 Pa)).

II. Processing Condition 2

300 g of gum arabic (unmodified) was placed in a 1 L eggplant-type flask, and heated at 125° C. for 1 to 8 hours while slowly rotating with a rotary evaporator at normal pressure (1 atm. (101325 Pa)).

III. Processing Condition 3

300 g of gum arabic (unmodified) was placed in a 1 L eggplant-type flask, and heated at 90° C. for 30 minutes while slowly rotating with a rotary evaporator at reduced pressure (about 0.03 atm. (about 3040 Pa)) in such a manner that the loss-on-drying is 3.6%. Thereafter, the pressure was returned to normal pressure, and the resultants were then further heated at 125° C. for 1 to 8 hours.

<Evaluation Method>

(1) Loss-On-Drying (%)

The gum arabic samples to be measured were weighed before heating (weight A (g)), and after heating at 105° C. for 6 hours were re-weighed (weight B (g)). The weight difference (|B−A| (g)) obtained by subtracting the weight before heating (A (g)) from the weight after heating (B (g)) was converted to a percentage (% by weight) based on the weight before heating (B (g)) being taken as 100% by weight, i.e., [(|B−A| (g))/B(g)]×100].

(2) Discoloration Degree 90 g of ion-exchanged water was added to 10 g of each of the gum arabic samples to be measured, and mixed sufficiently, preparing aqueous 10% by weight gum arabic solutions. Each solution was placed in a quartz cell with a 10 mm optical path length, measurement by transmitted light was conducted using a ultraviolet and visible spectrophotometer V-560 (manufactured by JASCO Corp.), tristimulus values of a hunter color system (Lab color system)

were obtained, and $\sqrt{(a^2+b^2)}$ was calculated. This calculated value was considered to be the discoloration degree.

(3) Emulsifying Ability 74.75 g of water was added to 25 g of each of the gum arabic samples, and 0.13 g of sodium benzoate as a preservative and 0.12 g of citric acid for pH adjustment were admixed with each mixture and dissolved, preparing aqueous 25% by weight gum arabic solutions with pH adjusted to 4.0. To 48 g of each of the obtained aqueous solutions was added 12 g of medium chain triglyceride (octanoic/decanoic acid triglyceride, O.D.O (trade name, manufactured by Nisshin Oil Mills, Ltd.)). Each resulting mixture was placed in a 100 ml screw tube, and was emulsified using a POLYTRON under the following conditions, preparing emulsions.

<POLYTRON Emulsification Conditions>

Emulsifying equipment: POLYTRON PT3000 (manufactured by KINEMATICA)
Generator shaft diameter: 12 mm
Rotation number: 25000 rpm
Emulsification period: 5 minutes The average particle diameter (median diameter) (μm) of each emulsion thus obtained was measured using a particle size distribution analyzer SALD-1100 (laser diffraction type, manufactured by Shimadzu Corporation). Generally, the smaller is the average particle diameter of the emulsion prepared using the emulsifier, the more excellent is the emulsifiability of an emulsifier ("Study by the turbidimetric assay method of O/W emulsion emulsified with gum arabic", Yakugaku Zasshi (Pharmacology Journal), 112(12)906-913, (1992)).

(4) Weight Average Molecular Weight and AGP Content

The weight average molecular weight and AGP content of the gum arabic were determined by the use of gel permeation chromatography (GPC-MALLS) wherein three detectors, i.e., a multi angle laser light scattering detector (MALLS), a refractive index (RI) detector, and an ultraviolet (UV) detector are coupled on-line, and the obtained data are then processed with ASTRA Version 4.5 (Wyatt Technology) software. According to GPC-MALLS, the molecular weight is measured by the MALLS detector, the weight of each component (composition ratio) is measured by the RI detector, and the protein content is measured by the UV detector. Therefore, the molecular weight and the composition of the analyzed components are obtained without reference to a standard gum arabic of known molecular weight. The detailed principals and characteristics of GPC-MALLS are given in "Idris, O. H. M., Williams, P. A. Phillips, G. O.; Food Hydrocolloids, 12, pp. 375-388 (1998)".

Measurement conditions for GPC-MALLS employed in the present invention were as follows:

Column: Superose (6 HR) 10/30 (Pharmacia Biotech, Sweden)
Flow rate: 0.5 ml/minute
Eluant: 0.2 M NaCl
Preparation of a sample: A sample to be analyzed was diluted with the eluant (0.2 M NaCl), the solution was filtered to remove insolubles, and the filtrate was measured.
Sample concentration: 0.4% (W/V)
Injection volume of sample solution: 100 μl
dn/dc: 0.141
Temperature: Room temperature
Detector: 1) MALLS (multi angle laser light scattering) detector: DAWN DSP (manufactured by Wyatt Technology Inc., USA)
2) RI (Refractive Index) detector
3) UV detector (absorption at 214 nm)

<Weight Average Molecular Weight>

"Weight (converted) average molecular weight" used in the present invention is defined as the molecular weight calculated based on weight, when all of the peaks on the chromatogram (RI chart) obtained with the RI detector were data-processed as one peak. The aforementioned one peak on the chromatogram denotes the area from a starting point to an ending point, when the point where the RI chart begins to rise from the baseline of the chromatogram is defined as the "starting point", and the point where the RI chart falls and intersects the baseline is defined as the "ending point". Based on the fact that the "weight (converted) average molecular weight" increases with an increase in emulsifying ability, "weight (converted) average molecular weight" is usable as an index for evaluating the emulsifying ability.

<AGP Content>

Figure 1:
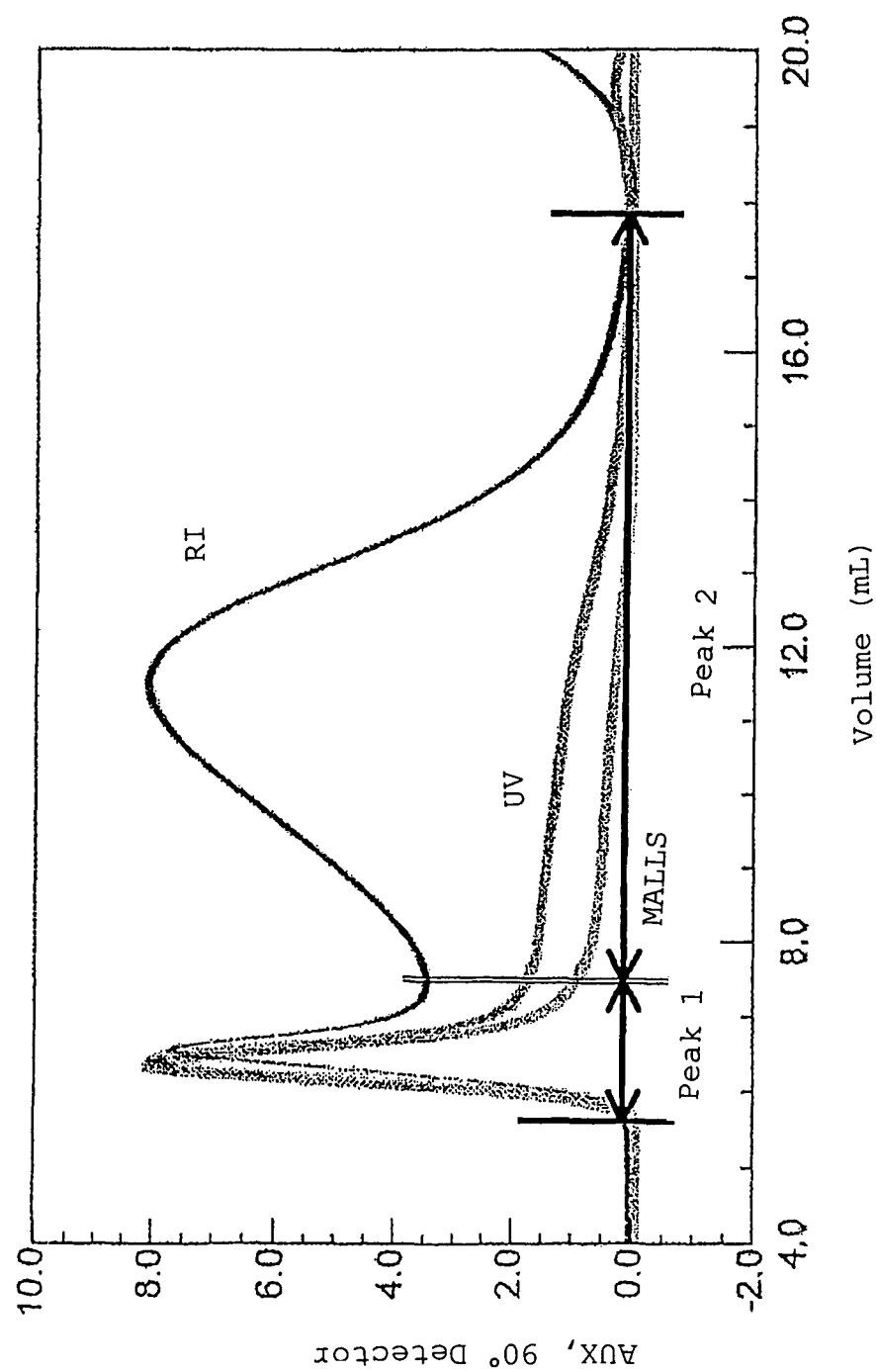
FIG. 1 is a chromatogram showing the results of analyzing gum arabic (unmodified) (*Acacia senegal*) according to GPC-MALLS. In the chromatogram (RI chart) obtained using an RI detector, the point where the RI chart begins to rise from the baseline of the chromatogram is defined as the "starting point" and the point where the RI chart falls and intercepts the base line is defined as the "ending point". Between the starting point and the ending point, the point where the RI value shows a minimum is defined as the boundary, with the area between the starting point and the boundary being defined as "Peak 1" and the area between the boundary and the ending point being defined as "Peak 2".

Based on the RI chart obtained under the above-described conditions, the eluted components are classified into two fractions; an eluted fraction of high molecular weight components which eluted first (Peak 1), and an eluted fraction of low molecular weight components which eluted at a later time (Peak 2), and the data were then processed with ASTRA Version4.5 (Wyatt Technology) software. The recovery ratio of Peak 1 (% Mass) is equivalent to the AGP content (% by weight) of the gum arabic subjected to GPC-MALLS. This is explained in more detail with reference to a chromatogram (FIG. 1) showing the analytical results of unmodified gum arabic (*Acacia senegal*) according to GPC-MALLS. In the RI chromatogram, the point where the RI chart begins to rise from the baseline of the chromatogram is defined as the "starting point" and the point where the RI chart falls and intercepts the base line is defined as the "ending point". Between the starting point and the ending point, the point where the RI value shows a minimum is defined as the boundary, with the area between the starting point and the boundary being defined as RI peak fraction 1 (Peak 1) and the area between the boundary and the ending point being defined as RI peak fraction 2 (Peak 2). Arabinogalactan protein (simply described as "AGP") is one of three major components contained in gum arabic, along with arabinogalactan (AG) and glycoprotein (GP). The AGP content in gum arabic increases with an increase in emulsifying ability, and thus is usable as an index for evaluating the emulsifying ability of gum arabic.

(5) Flavor 90 g of ion-exchanged water was added to 10 g of each of the gum arabic samples to prepare aqueous 10% gum arabic solutions, and each solution was sampled to evaluate flavor of each solution.

(6) Appearance

The appearance of each of the gum arabic samples was visually observed and then compared with its corresponding gum arabic (unmodified), and evaluated for discoloration, agglomeration of particles (mass formation), and the like.

Table 1 shows examination results of the gum arabic sample modified under Processing condition 1 (samples 1-1, 1-2, 1-3, 1-4, and 1-5). Table 2 shows examination results of the gum arabic sample modified under Processing condition 2 (samples 2-1, 2-2, 2-3, 2-4, and 2-5). Table 3 shows examination results of the gum arabic sample modified under Processing condition 3 (samples 3-1, 3-2, 3-3, 3-4, and 3-5)

TABLE 1

| Samples | Form | Processing conditions | Loss-on-drying (%) | Weight average molecular weight (10⁴) | AGP (%) | Emulsifying ability Median (μ) | Discoloration | Flavor | Conditions |
|---|---|---|---|---|---|---|---|---|---|
|  | Spray-dried powder | Unmodified | 11.3 | 65.0 | 11.0 | 1.13 | 9.3 | Little | No change in appearance |
| 1-1 | Spray-dried powder | Stirring at 125° C. for 1 hour at reduced pressure | 0 | 72.2 | 12.0 | 0.78 | 10.9 | Little | No change in appearance |
| 1-2 | Spray-dried powder | Stirring at 125° C. for 2 hours at reduced pressure | 0 | 87.3 | 15.1 | 0.75 | 13.8 | Little | Slight yellowish white but no significant change in appearance |
| 1-3 | Spray-dried powder | Stirring at 125° C. for 4 hours at reduced pressure | 0 | 108.5 | 18.5 | 0.74 | 16.3 | Some | Slight yellowish white but no significant change in appearance |
| 1-4 | Spray-dried powder | Stirring at 125° C. for 6 hours at reduced pressure | 0 | 144.1 | 25.2 | 0.77 | 18.3 | Some | Some yellowish white but no significant change in appearance |
| 1-5 | Spray-dried powder | Stirring at 125° C. for 8 hours at reduced pressure | 0 | 183.9 | 30.3 | 0.77 | 19.6 | Some | Some yellowish white but no significant change in appearance |

TABLE 2

| Samples | Form | Processing conditions | Loss-on-drying (%) | Weight average molecular weight (10⁴) | AGP (%) | Emulsifying ability Median (μ) | Discoloration | Flavor | Conditions |
|---|---|---|---|---|---|---|---|---|---|
|  | Spray-dried powder | Unmodified | 11.3 | 65.0 | 11.0 | 1.13 | 9.3 | Little | No change in appearance |
| 2-1 | Spray-dried powder | Stirring at 125° C. for 1 hour at normal pressure | 10.0 | 75.5 | 12.6 | 0.93 | 16.0 | Some | Browned and caked |
| 2-2 | Spray-dried powder | Stirring at 125° C. for 2 hours at normal pressure | 9.0 | 92.2 | 16.6 | 0.77 | 19.7 | Some | Browned and caked |
| 2-3 | Spray-dried powder | Stirring at 125° C. for 4 hours at normal pressure | 6.6 | 128.6 | 23.8 | 0.77 | 29.2 | Smell of burning | Heavily browned and heavily caked |
| 2-4 | Spray-dried powder | Stirring at 125° C. for 6 hours at normal pressure | 5.8 | 179.6 | 30.4 | 0.87 | 33.3 | Smell of burning | Heavily browned and heavily caked |
| 2-5 | Spray-dried powder | Stirring at 125° C. for 8 hours at normal pressure | 5.5 | 222.5 | 37.2 | 1.12 | 34.8 | Heavy smell of burning | Heavily browned and heavily caked |

TABLE 3

| Samples | Form | Processing conditions | Loss-on-drying (%) | weight average molecular weight (10⁴) | AGP (%) | Emulsifying ability Median (μ) | Discoloration | Flavor | Conditions |
|---|---|---|---|---|---|---|---|---|---|
| | Spray-dried powder | Unmodified | 11.3 | 65.0 | 11.0 | 1.13 | 9.3 | Little | No change in appearance |
| | Spray-dried powder | Stirring at 90° C. for 0.5 hour at reduced pressure | 3.6 | 65.0 | 11.0 | 1.11 | 9.3 | Little | Slightly caked |
| 3-1 | Spray-dried powder | Stirring at 125° C. for 1 hour at normal pressure | 3.2 | 73.6 | 12.6 | 0.89 | 14.4 | Some | Some browned and some caked |
| 3-2 | Spray-dried powder | Stirring at 125° C. for 2 hours at normal pressure | 2.9 | 92.5 | 16.0 | 0.77 | 16.9 | Some | Some browned and some caked |
| 3-3 | Spray-dried powder | Stirring at 125° C. for 4 hours at normal pressure | 2.6 | 120.3 | 20.6 | 0.77 | 23.0 | Some | Browned and caked |
| 3-4 | Spray-dried powder | Stirring at 125° C. for 6 hours at normal pressure | 2.3 | 162.4 | 26.9 | 0.76 | 26.3 | Smell of burning | Heavily browned and heavily caked |
| 3-5 | Spray-dried powder | Stirring at 125° C. for 8 hours at normal pressure | 1.7 | 200.9 | 30.9 | 0.77 | 28.5 | Smell of burning | Heavily browned and heavily caked |

Figure 2:
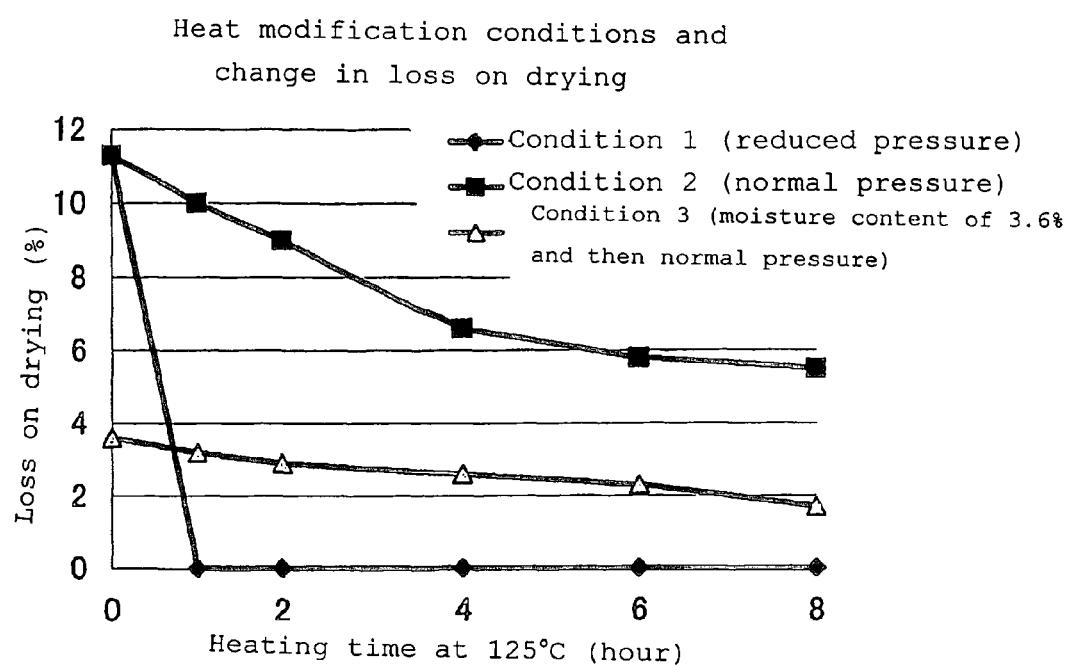
FIG. 2 shows the relationship between heating time (1 to 8 hours) at a temperature of 125° C. and loss-on-drying (%) with respect to each of the samples obtained under processing conditions 1 to 3 of Experimental Example 1.
Figure 3:
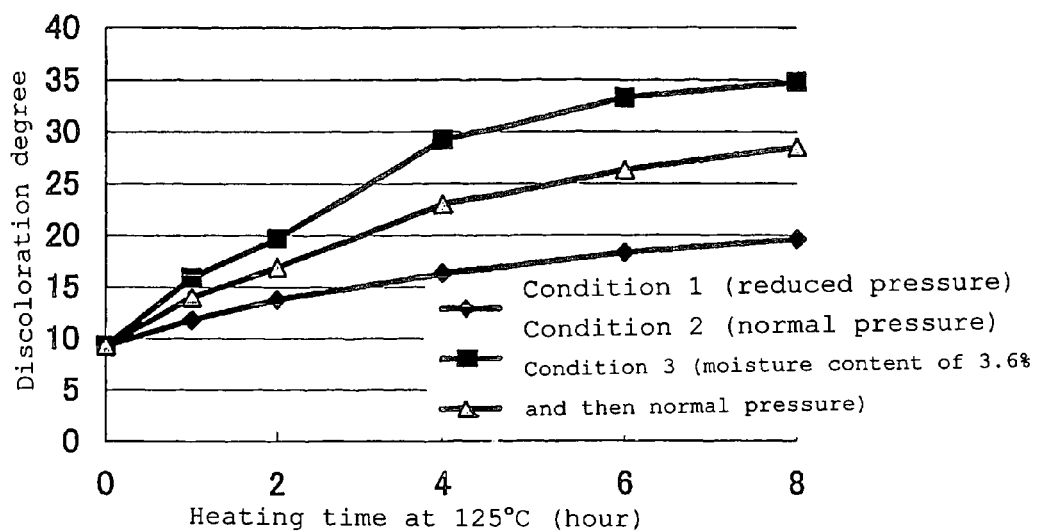
FIG. 3 shows the relationship between heating time (1 to 8 hours) at a temperature of 125° C. and discoloration degree with respect to each of the samples obtained under processing conditions 1 to 3 of Experimental Example 1.

Based on the above results, each of the samples processed under Processing Conditions 1-3 was examined for the relationship 5 between heating time (1 to 8 hours) and loss-on-drying (%) and the relationship between heating time (1 to 8 hours) and discoloration, and the results are shown in FIGS. 2 and 3, respectively.

As shown in FIG. 2, the loss-on-drying of gum arabic treated under processing condition 1 (heat-treatment at reduced pressure) was reduced to 0% within 1 hour, and thereafter was maintained 0% during the heat-treatment. The loss-on-drying of gum arabic treated under processing condition 3 (dried to be 3.6% of loss-on-drying, and then heated at normal pressure) was held at 3.6% or less during the heat-treatment. The loss-on-drying of gum arabic treated under processing condition 2 (heat-treatment at normal pressure) was gradually decreased during the heat-treatment, however the loss-on-drying did not decrease to 5% or less. FIG. 3 shows the relationship between loss-on-drying and discoloration, and as is clear from FIG. 3, the lower is the loss-on-drying of the gum arabic (i.e., the higher is the dry degree of the gum arabic), the higher is the suppression degree of discoloration due to heat-treatment.

Experimental Example 2

Four types of gum arabic (unmodified) samples with different particle diameters (samples described below) (14.5% to 14.8% of loss-on-drying) were prepared from the same gum arabic beads (*Acacia senegal*), and 300 g of each of the gum arabic samples was heated at 125° C. for 3 to 12 hours. For the obtained gum arabic samples, loss-on-drying (%), a discoloration degree, an emulsifying ability [average particle diameter (median diameter) (μm)], the content of arabinogalactan protein (AGP content (%)), flavor, and appearance were measured in the same manner as in Experimental Example 1. Weight recovery ratio (%) and polydispersity (P) were determined according to the method below.

Samples: Gum Arabic (Unmodified)
1) Gum arabic beads, unpulverizates (particle diameter of 2 mm to 100 mm, average particle diameter of 30 mm)
2) Coarse pulverizates of gum arabic beads (particle diameter of 0.5 mm to 15 mm, average particle diameter of 6 mm)
3) Pulverizates of gum arabic beads (particle diameter of 0.1 mm to 2 mm, average particle diameter of 1.5 mm)
4) Fine pulverizates of gum arabic beads (particle diameter of 0.038 mm to 0.5 mm, average particle diameter of 0.083 mm (83 μm))

(1) Weight Recovery Ratio (%) and polydispersity (P)

Weight recovery ratio and polydispersity (P) of the gum arabic are determined by subjecting the gum arabic to be measured to GPC-MALLS under the same conditions as in Experimental Example 1, and processing the obtained data by ASTRA Version 4.5 (Wyatt Technology) software.

<Weight Recovery Ratio>

When all of the peaks on the chromatogram (RI chart) obtained with the RI detector under the above-described GPC-MALLS conditions were data-processed as one peak, "weight recovery ratio" used in the present invention is defined as the recovery ratio of the one peak calculated based on weight. The aforementioned one peak on the chromatogram means the area from a starting point to an ending point, when the point where the RI chart begins to rise from the baseline of the chromatogram is defined as the "starting point", and the point where the RI chart falls and intersects the baseline is defined as the "ending point". It is known that the weight recovery ratio of one peak of unmodified gum arabic and modified gum arabic are approximately 100%. However, it is also known that since a high molecular weight component that is excessively modified and thus does not dissolve in water (which may be referred to as "hydrogel") is filtrated as insoluble matter with a 0.45-μm membrane filter during the process for preparing the sample for GPC measurement, the weight recovery ratio of one peak falls and the emulsifying ability also lowers due to production of such high molecular weight hydrogel that is insoluble in water.

As described above, when gum arabic (unmodified) is modified, the emulsifying ability is usually improved with an increase in the above-mentioned weight average molecular weight or AGP content. However, when gum arabic (unmodified) is excessively modified, the emulsifying ability is lowered. Thus, the weight recovery ratio is used as an index for hydrogel generation.

<Polydispersity (P)>

When all of the peaks on the chromatogram (RI chart) obtained by GPC-MALLS under the above-described conditions were data-processed as one peak, polydispersity (P) is defined as the ratio of weight (converted) average molecular weight to the number (converted) average molecular weight, and thus is obtained by dividing the weight (converted) average molecular weight by the number (converted) average molecular weight. The obtained polydispersity (P) is used as a standard by which uniformity of the molecular weight distribution is shown. The number (converted) average molecular weight and the weight (converted) average molecular weight are determined by processing the GPC-MALLS data by using ASTRA Version 4.5 (Wyatt Technology) software. The higher the P value is, the less uniform the molecular weight distribution is, while the lower the P value is, the more uniform the molecular weight distribution is. When the P value is high, the degree of modification and efficiency of the gum arabic are not satisfactory, which is shown by a non uniformity molecular weight distribution, generation of hydrogels, lowered emulsification properties, and the like. In contrast, when the P value is low, it is considered that gum arabic is efficiently modified, which is shown by uniform molecular weight distribution, no hydrogel generation, and clearly improved emulsification properties.

The results are shown in Table 4.

TABLE 4

| | Processing conditions | Loss-on-drying (%) | AGP (%) | Weight recovery ratio (%) | Polydispersity (P) | Emulsifying ability Median (μ) | Discoloration | Conditions |
|---|---|---|---|---|---|---|---|---|
| Samples 1) Gum arabic (unpulverizates) 30 mm | Unmodified | 14.8 | 14.3 | 100 | 2.1 | 1.75 | 6.1 | No change in appearance |
| | 125° C., 3H | 11.1 | 20.9 | 96 | 5.2 | 1.23 | 17.1 | Dried surface and wet interior |
| | 125° C., 6H | 7.0 | 24.1 | 93 | 6.2 | 1.61 | 34.8 | Dried surface and wet interior |
| | 125° C., 12H | 2.7 | 25.0 | 80 | 6.7 | 3.15 | 36.6 | Dried surface and wet interior |
| Samples 2) Gum arabic (coarse pulverizates 6 mm | Unmodified | 14.8 | 15.6 | 100 | 2.1 | 1.55 | 5.9 | No change in appearance |
| | 125° C., 3H | 6.5 | 19.3 | 98 | 4.5 | 1.09 | 25.9 | Dried surface and wet interior |
| | 125° C., 6H | 2.8 | 24.5 | 96 | 5.5 | 2.15 | 36.5 | Dried surface and wet interior |
| | 125° C., 12H | 1.3 | 26.9 | 93 | 6.0 | 2.84 | 37.5 | Dried surface and wet interior |
| Samples 3) Gum arabic (pulverizates) 1.5 mm | Unmodified | 14.5 | 14.7 | 100 | 2.1 | 1.42 | 7.0 | No change in appearance |
| | 125° C., 3H | 2.5 | 18.2 | 99 | 3.8 | 0.81 | 12.1 | No significant change in appearance |
| | 125° C., 6H | 1.4 | 20.9 | 98 | 4.5 | 1.04 | 21.1 | No change in appearance |
| | 125° C., 12H | 0.3 | 26.5 | 95 | 5.3 | 1.17 | 25.6 | No change in appearance |
| Samples 4) Gum arabic (Fine Pulverizates) 0.083 mm | Unmodified | 14.5 | 14.7 | 100 | 2.1 | 1.42 | 7.0 | No change in appearance |
| | 125° C., 3H | 0.5 | 18.2 | 100 | 3.6 | 0.79 | 10.5 | No change in appearance |
| | 125° C., 6H | 0 | 23.8 | 99 | 4.3 | 0.76 | 14.6 | No change in appearance |

TABLE 4-continued

| Processing conditions | Loss-on-drying (%) | AGP (%) | Weight recovery ratio (%) | Polydispersity (P) | Emulsifying ability Median (μ) | Discoloration | Conditions |
|---|---|---|---|---|---|---|---|
| 125° C., 12H | 0 | 26.6 | 97 | 5.0 | 1.02 | 19.5 | No change in appearance |

Figure 4:
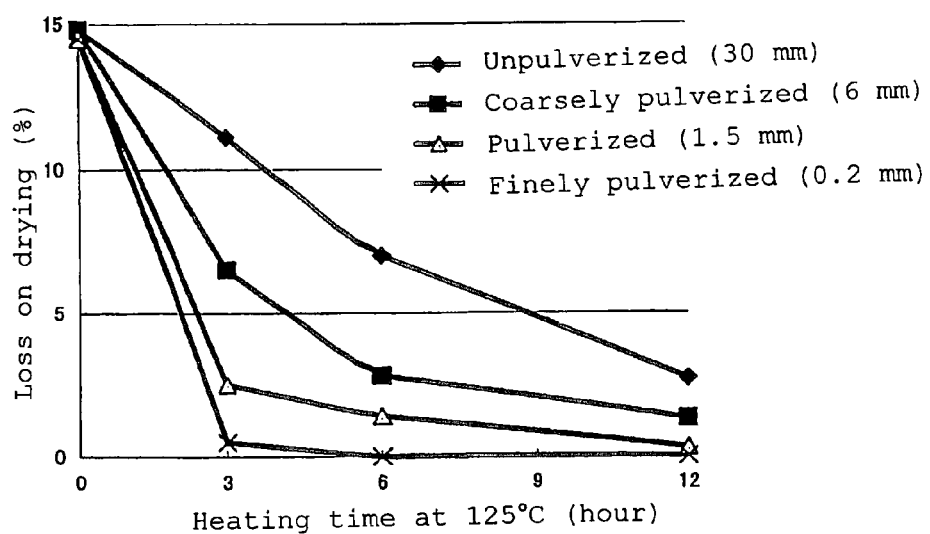
FIG. 4 shows the relationship between loss-on-drying (%) by heating at 125° C. and particle diameter (mm) with respect to the following samples 1) to 4) obtained according to Experimental Example 2.

Based on these results for each of the samples 1) to 4), the relationship between loss-on-drying (%) due to heating and particle diameter (mm), and the relationship between discoloration due to heating and particle diameter (mm) were examined, and the obtained examination results are shown in FIGS. 4 and 5. As shown in FIG. 4, gum arabic with a smaller particle diameter was promptly dried by heating. As is clear from FIG. 5, gum arabic with a smaller particle diameter (especially, pulverizates, fine pulverizates) exhibited significantly suppressed discoloration because such gum arabic was dried promptly.

FIG. 6 shows the relationship between the particle diameter (mm) and the emulsifying ability of gum arabic modified by heating. As is clear from FIG. 6, gum arabic (unmodified) to be heated having a smaller particle diameter was promptly dried, and as a result, such gum arabic was favorably modified (emulsifying ability is increased) while discoloration was significantly suppressed.

In contrast, it was confirmed that when gum arabic (unmodified) to be heated has a large particle diameter, discoloration is likely to proceed and such gum arabic is not uniformly modified (emulsifying ability was not improved). This is possibly caused by a difference in the dry degree between the interiors of gum arabic (unmodified) particles and the exteriors (surfaces) thereof, and this difference increases as the particle diameter of gum arabic increases. In the particles of gum arabic (unmodified), the surface is usually dry as compared with the interior thereof. In other words, the particle interior has a higher moisture content as compared with the particle surface. Therefore, when gum arabic is heated under conditions where the particle surfaces with lower moisture content are favorably modified to increase the emulsifying ability, the particle interiors are excessively modified, which causes generation of hydrogel, resulting in poor emulsifying ability. This is shown by the weight recovery ratio (%) and the polydispersity value (P) as determined by GPC-MALLS shown in Table 4. To be more specific, when the particle diameter is large, the P value sharply varies (i.e., nonuniform molecular weight distribution) and the recovery ratio is lowered (i.e., the generation of hydrogel).

Experimental Example 3

300 g of fine pulverizates of gum arabic (unmodified) (*Acacia senegal*) beads (particle diameter of 38 μm to 500 μm: average particle diameter of 83 μm: loss-on-drying of 13.9%) was heated at 125° C. for 1 to 8 hours at reduced pressure (about 0.03 atm., (about 3040 Pa)). Loss-on-drying (%), discoloration degree, emulsifying ability [average particle diameter (median diameter) (μm)], and content of arabinogalactan protein (AGP content (%)) for the obtained gum arabic samples were measured following the procedure of Experimental Example 1. Polydispersity (P) and weight recovery ratio (%) were also determined following the procedure of Experimental Example 2. The results are shown in Table 5.

TABLE 5

| Sample | Form | Processing conditions | Loss-on-drying (%) | AGP (%) | Emulsifying ability Median (μ) | Discoloration | Polydispersity (P) | Weight recovery ratio (%) |
|---|---|---|---|---|---|---|---|---|
| Blank | Fine Pulverizates | Unmodified | 13.9 | 14.0 | 1.03 | 5.2 | 2.1 | 100 |
| (3)-1 | Fine Pulverizates | Stirring at 125° C. for 1 hour at reduced pressure | 0.2 | 15.4 | 0.78 | 6.9 | 2.5 | 100 |
| (3)-2 | Fine Pulverizates | Stirring at 125° C. for 2 hours at reduced pressure | 0 | 17.0 | 0.75 | 9.4 | 2.9 | 100 |
| (3)-3 | Fine Pulverizates | Stirring at 125° C. for 4 hours at reduced pressure | 0 | 20.3 | 0.75 | 12.2 | 3.6 | 100 |
| (3)-4 | Fine Pulverizates | Stirring at 125° C. for 6 hours at reduced pressure | 0 | 25.2 | 0.81 | 14.9 | 4.4 | 99 |
| (3)-5 | Fine Pulverizates | Stirring at 125° C. for 8 hours at reduced pressure | 0 | 26.6 | 0.85 | 17.3 | 4.8 | 99 |

It is clear from the above results that the AGP content increased with increasing heat treatment time under dry conditions, and thus the emulsification property was improved.

Experimental Example 4

300 g of gum arabic spray-dried powder (particle diameter of 38 μm to 300 μm: average particle diameter of 64 μm) (gum arabic (*Acacia segenal*) beads were stirred and dissolved in hot water, and spray dried) (loss-on-drying of 11.3%) was heated at 125° C. for 1 to 10 hours at reduced pressure (about 0.03 atm., (about 3040 Pa)). For the obtained gum arabic samples, loss-on-drying (%), discoloration degree, emulsifying ability [average particle diameter (median diameter) (μm)], and arabinogalactan protein content (AGP content (%)) were measured following the procedure of Experimental Example 1. Polydispersity (P) and weight recovery ratio (%) were also determined following the procedure of Experimental Example 2. Further, the viscosity (mpa·s) was measured as follows.

<Measurement Method of Viscosity>

10 g of each of the gum arabic samples was dissolved in 90 g of water to prepare aqueous 10% by weight gum arabic solutions. Each solution was placed in a 100-ml screw tube, and the viscosity (mPa·S) was measured using B-type rotation viscometer (BM type, manufactured by TOKIMEC Inc.) (temperature: 20° C., Rotor: NO. 1, Rotation: 60 rpm). The results are shown in Table 6.

The above results shows that the AGP content increased with increasing heat treatment time under dry conditions, and thus the 5 emulsifying ability was improved.

Experimental Example 5

300 g of gum arabic spray-dried powder (particle diameter of 38 μm to 300 μm: average particle diameter of 64 μm) (gum arabic beads were stirred and dissolved in hot water, and spray dried) (loss-on-drying of 11.3%) was placed in a 1 L eggplant-type flask, and heated at 90° C. for 60 minutes while slowly rotating with a rotary evaporator at reduced pressure (about 0.03 atm. (about 3040 Pa)) in such a manner that loss-on-drying was 0%. It was then further heated under the following heating conditions while slowly rotating with a rotary evaporator at reduced pressure (about 0.03 atm. (about 3040 Pa).

Sample 1) 90° C., 24 hours

Sample 2) 110° C., 12 hours

Sample 3) 125° C., 4 hours

Sample 4) 140° C., 2 hours

Sample 5) 180° C., 10 minutes

Sample 6) 70° C., 24 hours

Sample 7) 200° C., 10 minutes

TABLE 6

| Samples | Form | Processing conditions | Loss-on-drying (%) | AGP (%) | Emulsifying ability Median (μ) | Discoloration | Viscosity (mPa · S) | Polydispersity (P) | Weight recovery ratio (%) |
| --- | --- | --- | --- | --- | --- | --- | --- | --- | --- |
| Blank | Spray-dried powder | Unmodified | 11.3 | 11.0 | 1.13 | 9.3 | 11.7 | 2.1 | 100 |
| (4)-1 | Spray-dried powder | Stirring at 125° C. for 1 hour at reduced pressure | 0 | 12.0 | 0.78 | 10.9 | 11.3 | 2.2 | 100 |
| (4)-2 | Spray-dried powder | Stirring at 125° C. for 2 hours at reduced pressure | 0 | 15.1 | 0.75 | 13.8 | 12.4 | 2.5 | 100 |
| (4)-3 | Spray-dried powder | Stirring at 125° C. for 4 hours at reduced pressure | 0 | 18.5 | 0.74 | 16.3 | 13.3 | 3.0 | 101 |
| (4)-4 | Spray-dried powder | Stirring at 125° C. for 6 hours at reduced pressure | 0 | 25.2 | 0.77 | 18.3 | 14.3 | 3.4 | 100 |
| (4)-5 | Spray-dried powder | Stirring at 125° C. for 8 hours at reduced pressure | 0 | 30.3 | 0.77 | 19.6 | 16.4 | 3.8 | 100 |
| (4)-6 | Spray-dried powder | Stirring at 125° C. for 10 hours at reduced pressure | 0 | 35.6 | 0.83 | 20.9 | 19.0 | 4.2 | 100 |

The results are shown in Table 7.

TABLE 7

| Samples | Form | Processing conditions | Weight average molecular weight ($10^4$) | AGP (%) | Emulsifying ability Median (μ) | Discoloration | Flavor | Conditions |
|---|---|---|---|---|---|---|---|---|
| Blank | Spray-dried powder | Unmodified | 65.0 | 11.0 | 1.13 | 9.3 | Little | No change in appearance |
| Sample 1) | Spray-dried powder | Stirring at 90° C. for 24 hours at reduced pressure | 98.6 | 16.8 | 0.75 | 13.9 | Some | Slightly yellowish white but no change in appearance |
| Sample 2) | Spray-dried powder | Stirring at 110° C. for 24 hours at reduced pressure | 105.0 | 18.9 | 0.74 | 15.5 | Some | Slightly yellowish white but no change in appearance |
| Sample 3) | Spray-dried powder | Stirring at 125° C. for 4 hours at reduced pressure | 108.5 | 21.7 | 0.74 | 16.3 | Some | Slightly yellowish white but no change in appearance |
| Sample 4) | Spray-dried powder | Stirring at 140° C. for 2 hours at reduced pressure | 132.5 | 24.5 | 0.75 | 17.5 | Some | Slightly yellowish white but no change in appearance |
| Sample 5) | Spray-dried powder | Stirring at 180° C. for 10 minutes at reduced pressure | 155.2 | 25.8 | 0.77 | 19.8 | Smell of burning | Yellowish white but little change in appearance |
| Sample 6) | Spray-dried powder | Stirring at 70° C. for 24 hours at reduced pressure | 66.0 | 11.9 | 1.12 | 10.9 | No Smell of burning | No change in appearance |
| Sample 7) | Spray-dried powder | Stirring at 200° C. for 10 minutes at reduced pressure | 187.9 | 32.5 | 1.18 | 42.5 | Heavy smell of burning | Heavy yellowish white discoloration and partially burned black |

Among the samples of the above-described Experimental Examples, the following Examples were conducted using Samples 1-1 to 1-5 of Experimental Example 1, Samples 3) and 4) of Experimental Example 2, Samples (3)-1 to (3)-5 of Experimental Example 3, Samples (4)-1 to (4)-6 of Experimental Example 4, and Samples 1) to 5) of Experimental Example 5.

Example 1

β-Carotene Emulsion (an Emulsified Colorant Preparation)

<Formulation>

| | |
|---|---|
| β-Carotene 30% suspension | 5 (% by weight) |
| Medium-chain triglyceride | 10 |
| Modified gum arabic | 17 |
| Water | 68 |
| Total | 100 (% by weight) |

170 g of modified gum arabic was dissolved in 680 g of water, giving an aqueous 20% by weight modified gum arabic solution. The gum arabic solution was used as an emulsifier, and to the solution was added a mixed solution prepared in advance by dissolving 100 g of medium-chain triglyceride (octanoic/decanoic acid triglyceride O.D.O (trade name, product of Nisshin Oil Mills, Ltd.)) in 50 g of a 30% suspension of β-carotene with heating at 150° C., followed by mixing with stirring. The mixture was emulsified with a homogenizer (manufactured by APV Gaulin) (homogenized 4 times at the pressure of 4.4 MPa (450 kg/cm²)) to give a β-Carotene emulsion serving as an emulsified colorant preparation.

Example 2

Orange Flavoring Emulsion (an Emulsified Flavoring)

<Formulation>

| | |
|---|---|
| Orange flavoring | 2 (% by weight) |
| Medium-chain triglyceride | 13 |
| Modified gum arabic | 17 |
| Water | 68 |
| Total | 100 (% by weight) |

170 g of modified gum arabic was dissolved in 680 g of water, giving an aqueous 20% by weight modified gum arabic solution. The gum arabic solution was used as an emulsifier, and to the solution was added a mixed solution prepared in advance by sufficiently mixing 20 g of orange flavoring and 130 g of medium-chain triglyceride (octanoic/decanoic acid triglyceride O.D.O (trade name, product of Nisshin Oil Mills, Ltd.)) at room temperature, followed by mixing with stirring. The mixture was emulsified with a homogenizer (manufactured by APV Gaulin) (homogenized 4 times at the pressure of 4.4 MPa (450 kg/cm$^2$)) to give an orange flavoring emulsion serving as an emulsified flavoring.

Example 3

Docosahexaeoic Acid (DHA) Emulsion (an Emulsified DHA Preparation)

<Formulation>

| | |
|---|---|
| 20% DHA containing fish oil | 5 (% by weight) |
| Medium-chain triglyceride | 10 |
| Modified gum arabic | 17 |
| Water | 68 |
| Total | 100 (% by weight) |

170 g of modified gum arabic was dissolved in 680 g of water, giving an aqueous 20% by weight modified gum arabic solution. The gum arabic solution was used as an emulsifier, and to the solution was added a mixed solution prepared in advance by mixing 50 g of 20% by weight DHA containing fish oil and 100 g of medium-chain triglyceride (octanoic/decanoic acid triglyceride O.D.O (trade name, product of Nisshin Oil Mills, Ltd.)) and heating the mixture at 80° C., followed by mixing with stirring. The mixture was emulsified with a homogenizer (manufactured by APV Gaulin) (homogenized 4 times at the pressure of 4.4 MPa (450 kg/cm$^2$)) to give a DHA emulsion.

Example 4

Lemon Powder Flavoring

<Formulation>

| | |
|---|---|
| Lemon oil | 20 (parts by weight) |
| Modified gum arabic | 20 |
| Dextrin | 60 |
| Water | 150 |
| Total | 250 (parts by weight) |

200 g of modified gum arabic and 600 g of dextrin were dissolved in 1500 g of water to prepare an aqueous solution of modified gum arabic. The aqueous gum arabic solution was used as an emulsifier. 200 g of lemon oil was added to the aqueous gum arabic solution, followed by mixing under stirring. The obtained mixture was emulsified with a homogenizer (manufactured by APV Gaulin) (homogenized once at the pressure of 2.0 MPa (200 kg/cm$^2$)). Subsequently, the solution was spray-dried with a spray dryer (manufactured by ANHYDRO) (inlet temperature 140° C., outlet temperature 80° C.), to prepare 950 g of lemon powder flavoring.

INDUSTRIAL APPLICABILITY

According to the present invention, a modified gum arabic having an improved emulsifying ability can be efficiently obtained by heating gum arabic under dry conditions while preventing discoloration or agglomeration of gum arabic during heating. Therefore, the method of the invention is useful not only as a method for providing modified gum arabic having an improved emulsifying ability without adversely affecting the subsequent workability or ease of handling, or without degradation in quality, due to agglomeration, sticking, discoloration, or the like, but also as a method for efficiently modifying gum arabic to improve its emulsifying ability.

The modified gum arabic of the invention thus obtained can be suitably used for emulsifying various hydrophobic substances such as essential oils, oil-based colorants, oil-based flavorings, fat-soluble vitamins, etc. Compared with an emulsion prepared using ordinary gum arabic (unmodified), an emulsion prepared using the modified gum arabic of the invention has a uniform particle size distribution and is very stable, so that emulsified particles are significantly prevented from degradation due to coagulation or unification of the emulsified particles caused by hard dealing (severe conditions) such as heating, long-term storage, changes over time, etc.

The invention claimed is:

1. A method for producing modified gum arabic, the method comprising the step of heating dried gum arabic having a loss-on-drying of not more than 3%,
    wherein the dried gum arabic to be heat treated has an average particle diameter of not more than 1.5 mm;
    the gum arabic is heated at a temperature of 90° C. to 180° C.; and
    wherein the heating time is not less than 15 minutes.

2. The method for producing modified gum arabic according to claim 1, wherein the dried gum arabic to be heat treated is spray-dried.

3. The method for producing modified gum arabic according to claim 1, wherein discoloration is suppressed and emulsifying ability is increased in the modified gum arabic.

4. The method for producing modified gum arabic according to claim 1, wherein the dried gum arabic is heated at a reduced pressure.

5. The method of claim 1, wherein the average particle diameter is in the range of 0.01 to 1.5 mm.

6. The method of claim 1, wherein the modified gum arabic has suppressed caking compared to gum arabic obtained by heating gum arabic having an average particle diameter of not more than 1.5 mm and a loss on drying of more than 3% at a temperature of 90° C. to 180° C.

7. The method for producing modified gum arabic according to claim 1, wherein the dried gum arabic is heated at a temperature of 100° C. to 150° C.

8. The method for producing modified gum arabic according to claim 7, wherein the dried gum arabic is heated at a reduced pressure.

9. The method of claim 7, wherein the average particle diameter is in the range of 0.01 to 1.5 mm.

10. The method of claim 7, wherein the modified gum arabic has suppressed caking compared to gum arabic obtained by heating gum arabic having an average particle diameter of not more than 1.5 mm and a loss on drying of more than 3% at a temperature of 90° C. to 180° C.

* * * * *